United States Patent
Moore et al.

[15] 3,642,439
[45] Feb. 15, 1972

[54] METHOD OF SEPARATING MAGNESIUM FROM WET-PROCESS PHOSPHORIC ACID

[72] Inventors: William P. Moore, Chester; Rob R. MacGregor, Prince George; William C. Sierichs, Hopewell, all of Va.

[73] Assignee: Allied Chemical Corporation, New York, N.Y.

[22] Filed: Oct. 15, 1969

[21] Appl. No.: 866,752

[52] U.S. Cl. .................................................23/165, 71/40
[51] Int. Cl. .......................................................C01b 25/22
[58] Field of Search ..................23/165, 165 B, 165 D; 71/40

[56] References Cited

UNITED STATES PATENTS

| | | | |
|---|---|---|---|
| 3,273,713 | 9/1966 | Parrish | 23/153 |
| 3,379,501 | 4/1968 | Treitler et al. | 23/165 |
| 3,442,609 | 5/1969 | Carothers et al. | 23/165 |
| 3,481,700 | 12/1969 | Legal et al. | 23/165 |
| 3,206,282 | 9/1965 | Crawford et al. | 23/165 |

FOREIGN PATENTS OR APPLICATIONS

| | | | |
|---|---|---|---|
| 467,843 | 6/1937 | Great Britain | 23/165 |
| 1,024,924 | 4/1966 | Great Britain | 23/165 |

*Primary Examiner*—Oscar R. Vertiz
*Assistant Examiner*—Gregory A. Heller
*Attorney*—Patrick L. Henry and Fred L. Kelley

[57] ABSTRACT

A method of separating magnesium from wet-process phosphoric acid characterized in that the magnesium is separated as a readily filterable fluoride-phosphate complex compound containing magnesium and aluminum. The fluoride ion required for formation of the magnesium-containing precipitate is preferably formed by hydrolysis of fluorine compounds normally in the crude acid. In the case of insufficient quantities of any of said precipitation components, additions of such components are made to the acid or to the reaction components from which the acid is produced. The wet-process phosphoric acid low in magnesium is especially useful for production of stable ammonium polyphosphate fertilizer solutions.

8 Claims, No Drawings

METHOD OF SEPARATING MAGNESIUM FROM WET-PROCESS PHOSPHORIC ACID

BACKGROUND OF THE INVENTION

This invention relates to the treatment of phosphoric acid and more particularly refers to an improved process for the removal of magnesium from wet-process phosphoric acid.

Phosphoric acid by the so-called wet-process is conventionally produced by digesting phosphate rock with sulfuric acid which reacts to form phosphoric acid of a concentration of about 30 percent $P_2O_5$ by weight, and gypsum which is insoluble in the reaction products. The gypsum is separated from the phosphoric acid by the usual means such as filtration or settling or both and the resultant weak acid may be used as an article of commerce. For many important commercial uses, such as for example production of liquid fertilizers, the weak acid is concentrated by evaporation to provide phosphoric acid containing about 50–70 percent $P_2O_5$.

While the wet-process for phosphoric acid is simple in concept, it is fraught with many technical difficulties, and the resultant phosphoric acid is a highly impure material, containing relatively large amounts of dissolved sulfates and smaller amounts of fluorides, fluosilicates and other salts of aluminum, magnesium, iron and other metals. These impurities precipitate and settle out as solids or sludge at a slow rate occurring over an interval of many days and even months. The amount of solids which settle out varies with the purity of the phosphate rock from which the acid is derived and is generally from 0.5 to 10 percent by weight of acid.

It is known that iron and aluminum ions present as predominant metal impurities in wet-process phosphoric acid, form gelatinous precipitates which render ammonium salt fertilizer solutions prepared therefrom thixotropic and gelatinous. U.S. Pat. No. 3,044,851, discloses that the formation of gelatinous iron and aluminum precipitates can be prevented by heating the acid to expel the fluoride impurities, and thereafter forming acyclic polyphosphoric acids, including pyrophosphoric acid, in the acid. Moreover, this patent discloses that magnesium requires a far higher concentration of polyphosphates to prevent precipitation than the same amount of other metal impurities and suggests that magnesium can be selectively removed from the dilute wet-process acid by passing the acid over a cation exchange resin. Unfortunately, use of a cation exchange resin is relatively expensive and time consuming.

It has also been suggested to remove the magnesium impurity by "overammoniation" of superphosphoric acid, which acid may be defined as phosphoric acid analyzing at least 66 percent $P_2O_5$. The superphosphoric acid is diluted with water and then ammoniated to a N/$P_2O_5$ ratio of about 0.4 to precipitate the magnesium as a complex ammonium phosphate. This procedure has the disadvantage that substantial loss of phosphate occurs because only a small proportion of the complex ammonium phosphate precipitate is magnesium.

Ponding procedures have also been used to separate magnesium from wet-process phosphoric acid. Of course, such procedures are inefficient and expensive, entailing capital investment of large storage tanks and the maintenance of large inventories.

SUMMARY OF THE INVENTION

An object of the present invention is to provide an efficient, economical method of rapidly removing soluble magnesium from wet-process phosphoric acid. Another object of the invention is to reduce the magnesium content of the acid without recourse to neutralization with ammonia. A further object of the present invention is to provide a purified wet-process phosphoric acid by removal of magnesium from the acid.

It has now been discovered that it is possible to precipitate magnesium from wet-process phosphoric acid in the form of well developed crystals which can easily be separated from the solution by settling or filtration. The precipitate consists of a complex magnesium-aluminum-fluoride-phosphate compound which on analysis is found to have a $MgO:Al_2O_3:F$ weight ratio of about 1:1.4:2.2. In case of insufficient quantities of the precipitation components in the crude acid, additions of such components are made to the acid solution or to the reaction components from which the acid solution is produced. For maximum precipitation of magnesium, excess aluminum and fluoride must be added to the acid.

It is essential that the fluoride for formation of the magnesium complex be present in the phosphoric acid solution as "free" hydrogen fluoride or fluoride ion. Fluorine is normally present in the acid in the form of $SiF_4$ or $H_2SiF_6$, which compounds are not effective to produce the desired magnesium complex. One embodiment of the invention involves hydrolysis of $H_2SiF_6$ in the acid and removal of $SiF_4$ to afford hydrogen fluoride for use in the process.

DESCRIPTION OF THE INVENTION

In accordance with one embodiment of the invention, soluble magnesium is removed from weak wet-process phosphoric acid containing about 25–35 weight percent $P_2O_5$. As previously stated, such acid is produced by digesting phosphate rock with sulfuric acid to form phosphoric acid and gypsum which is separated. The resultant weak acid contains dissolved fluorine, magnesium, silicon, calcium, iron, aluminum, sulfate, potassium and other impurities.

The process involves the following steps:

a. evaporating the weak phosphoric acid at a temperature of 85°–100° C. at a pressure below atmospheric to a concentration of 45–53 weight percent $P_2O_5$, preferably 47–51 weight percent $P_2O_5$, whereby the $H_2SiF_6$ content of the acid is reduced and the hydrogen fluoride content is increased;

b. maintaining the hydrogen fluoride content of the concentrated phosphoric acid at a F/MgO weight ratio of at least 2.2, preferably between 3 and 12;

c. maintaining the soluble aluminum content of the concentrated phosphoric acid, measured as $Al_2O_3$, at an $Al_2O_3$/MgO weight ratio of at least 1.4, preferably between about 3 and 12;

d. maintaining the concentrated phosphoric acid at 50°–100° C. for 15–40 hours to form a precipitate comprising a crystalline filterable magnesium-aluminum-fluoride-phosphate complex compound; and e. separating the precipitate from the purified concentrated phosphoric acid.

Preferably, the precipitation of the magnesium-containing complex is facilitated by seeding the phosphoric acid with about 1–4 weight percent precipitate from a previous operation of the process.

It is generally assumed that the fluorine in the raw phosphate rock is present as calcium fluoride and forms with tricalcium phosphate a complex compound. The aluminum is present in the raw phosphate rock, as a rule, in the form of alkali aluminum silicate. The quantity and composition of this silicate in different kinds of phosphate rock varies considerably. The fluorine is generally easily dissolved on treatment of the phosphate rock with sulfuric acid. The solubility of the aluminum differs, however, in different kinds of phosphates. The solubility rises with higher alkali content of the alkali aluminum silicate. It is also greater with phosphates which have been calcined at temperatures over 700° C.

As has already been mentioned, the fluorine is mainly dissolved in the crude phosphoric acid as silicon compounds which do not form the complex magnesium-aluminum-fluoride-phosphate compound of the present invention. However, a portion or all of the fluoride ion required for formation of the complex magnesium-containing precipitate can be obtained by decomposition of the $H_2SiF_6$ in the phosphoric acid in accordance with the following equation:

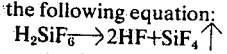

It has been demonstrated that during evaporation of weak wet-process phosphoric acid $SiF_4$ is vaporized preferentially over hydrogen fluoride and that maximum hydrogen fluoride is present in the acid when evaporation is advanced to 45–53 percent $P_2O_5$ concentration. At higher concentrations the hydrogen fluoride is rapidly volatilized.

Table I shows F and $SiO_2$ analyses and calculated $H_2SiF_6$ and HF contents of a typical wet process phosphoric acid during evaporation from a $P_2O_5$ content of 35.5 percent to a $P_2O_5$ content of 54 percent.

TABLE I

Evaporation of phosphoric acid at 85–100° C.

| $P_2O_5$ wt. % | F wt. % | $SiO_2$ wt. % | Calculated $H_2SiF_6$ wt. % | Calculated HF wt. % |
|---|---|---|---|---|
| 35.5 | 2.08 | 1.10 | 2.64 | 0 |
| 39.0 | 2.14 | 1.10 | 2.64 | 0.05 |
| 44.3 | 2.04 | 0.80 | 1.92 | 0.52 |
| 46.1 | 1.87 | 0.60 | 1.44 | 0.73 |
| 48.1 | 1.49 | 0.29 | 0.70 | 0.94 |
| 53.4 | 0.94 | 0.07 | 0.17 | 0.81 |
| 54.0 | 0.67 | Trace | — | ca. 0.67 |

The phosphoric acid is normally evaporated at about 85°–100° C. under reduced pressure to a $P_2O_5$ concentration of about 45–53 weight percent, whereby the $F/SiO_2$ weight ratio of the acid is increased to between 10 and 20. Preferably, the $SiO_2$ content of the acid is reduced to less than 0.2 weight percent, desirably to less than 0.1 weight percent.

Hydrogen fluoride or a soluble fluoride may be added to the concentrated phosphoric acid to obtain more complete and rapid precipitation of the magnesium complex. Preferably, the hydrogen fluoride content of the acid is maintained at a F/MgO weight ratio between about 3 and 12 during the precipitation step. Precipitation of the magnesium complex is increasingly rapid and complete with increasing F/MgO ratio; however, a weight ratio greater than 12 gives little added benefit and leads to excessive fluoride in the product acid.

As previously discussed, aluminum compounds are usually present in wet-process phosphoric acid. In some acids, sufficient aluminum is present to form the complex magnesium compound of the present invention. However, additional aluminum may be added as an aluminum compound soluble in the reaction mixture, for example as aluminum nitrate or aluminum sulfate. Preferably, the aluminum content of the acid is maintained at an $Al_2O_3/MgO$ weight ratio between about 3 and 12 during the precipitation step. Precipitation of magnesium is increasingly rapid and complete at $Al_2O_3/MgO$ weight ratios greater than 3 but ratios above 12 give little added benefit.

The process evaporation temperatures of 85°–100° C. are not very critical. In general, lower evaporation temperatures require lower pressures which increase costs of operation, whereas higher temperatures lead to increased corrosion problems. Magnesium complex precipitation temperatures of 50°–100b$L$ C. are also not very critical, but these temperatures appear to promote precipitation and are preferred. Filtration of the acid is very rapid when the acid is maintained at 50°–100b$L$ C.

Phosphoric acid purified by the instant process has the magnesium content greatly reduced with little reduction in the iron values. Table II shows the extent of removal of magnesium, aluminum and iron values.

TABLE II

Extent of Removal of Fe, Mg and Al

| Component | Concentrated Acid | Filtered Acid |
|---|---|---|
| $P_2O_5$ | 49.1 | 49.4 |
| MgO | 0.4 | 0.2 |
| $Al_2O_3$ | 1.2 | 0.9 |
| $Fe_2O_3$ | 2.1 | 2.0 |

The purified phosphoric acid of the instant invention is especially useful for production of stable ammonium polyphosphate fertilizer solutions. Typical fertilizer solutions are obtained by evaporating the purified acid to form superphosphoric acid, which is then diluted with water and ammoniated to pH 5–8. An aqueous ammoniated superphosphoric acid derived from purified wet-process phosphoric of the instant invention and having the following properties has been found to be stable for many months:

| | |
|---|---|
| Nitrogen | 10% by weight |
| Phosphorus[1] (as $P_2O_5$) | 34% by weight |
| Trace minerals | 2 to 3% by weight |
| iron ($Fe_2O_3$) | ca 2.0% by weight |
| calcium (CaO) | ca 0.1% by weight |
| magnesium (MgO) | ca 0.1% by weight |
| ph | 6.0 |
| Specific gravity at 60° F. | 1.4 |
| Salting out temperature | 0° F. |

[1]Distribution as percent by weight of the ammonium phosphates present was about:

37% ammonium orthophosphate
49% ammonium pyrophosphate
8% ammonium tripolyphosphate
5% ammonium tetrapolyphosphate
1% higher ammonium phosphates.

In the following examples all percents are by weight unless otherwise stated.

EXAMPLE I

The feed acid in this example was a typical weak wet-process phosphoric acid produced by the sulfuric acid acidulation of phosphate rock. The feed acid analyzed 35.3% $P_2O_5$, 2.0% F, 1.1% $SiO_2$, 0.3% MgO, 0.8% $Al_2O_3$, and 1.5% $Fe_2O_3$.

The weak wet-process phosphoric acid was concentrated to 50 percent $P_2O_5$ content by evaporation at 95° C. and 66 mm. Hg, whereby about 95 percent of the silicon was removed. Evaporation was stopped when the $F/SiO_2$ ratio had increased to 20. The concentrated acid analyzed 50.0% $P_2O_5$, 1.2% fluoride (about 1.1% as hydrogen fluoride), 0.4% MgO, 1.2% $Al_2O_3$, 0.06% $SiO_2$ and 2.1% $Fe_2O_3$.

The concentrated acid was stored at about 55° C. for 40 hours to promote crystal growth and settling of the complex magnesium-aluminum-fluoride-phosphate compound. The resulting partially clarified, heat-treated wet-process acid was then filtered.

A filtration test was conducted on the heat-treated wet-process phosphoric acid using a 97-square-foot vertical leaf-type filter. Prior to filtration, the filter leaves were precoated with 11 pounds of a diatomaceous earth precoat. The filter cloth was a close weave polypropylene. The filtration pressure was maintained constant at 45 p.s.i.g. and the temperature was 77° C. The acid fed to the filter contained 1.4 weight percent solids, 50 weight percent $P_2O_5$, 1.2 weight percent fluoride and 0.4 percent weight percent MgO. After 1 hour filtration, there had been collected 326 gallons of clear filtrate which analyzed 50 weight percent $P_2O_5$ and 0.7 weight percent F and 0.20 weight percent MgO. $P_2O_5$ recovery in the clear filtrate was 98 percent while MgO removal from the acid was 50 percent. The recovery of $Fe_2O_3$ in the filtrate was 93 percent, which demonstrates selective removal of MgO. The filter cake on a dry basis analyzed 11.5% $P_2O_5$, 14.5% MgO, 20.7% $Al_2O_3$ and 31.8% F corresponding to a MgO:$Al_2O_3$:F weight ratio of 1:1.4:2.2.

EXAMPLE II

This example demonstrates the beneficial effect on magnesium removal of adding hydrogen fluoride and aluminum sulfate to the concentrated acid.

The feed acid in this example was a wet-process phosphoric acid which analyzed 28.1% $P_2O_5$, 0.51% MgO, 0.88% F, 0.31% $Al_2O_3$ and 0.53% $SiO_2$. This weak acid was concentrated at 95° C. to a $P_2O_5$ content of 48.6 percent and a $SiO_2$ content of 0.16 percent. Prior to concentration, about 2 percent magnesium-containing precipitate from Example I was added to the acid solution to act as seed to facilitate precipitation. After concentration, the fluoride content was adjusted to 3.14 percent by addition of hydrogen fluoride, and the aluminum concentration, measured as $Al_2O_3$, was adjusted to 1.77 percent by addition of aluminum sulfate.

The concentrated acid was then stored at 67° C. for 24 hours to promote crystal growth and settling of the complex magnesium-aluminum-fluoride-phosphate compound. The resulting partially clarified acid was filtered to give a low-magnesium phosphoric acid which analyzed 48.7% $P_2O_5$, 0.03% MgO, 0.76% F, 0.73% $Al_2O_3$ and 0.23% $SiO_2$.

EXAMPLE III

This example was carried out in the same manner as Example II except that the concentrated adjusted acid was maintained at about 70° C. for various retention times prior to filtration. The following table indicates the importance of storage or retention time on the MgO content of the filtered acid.

| Retention Time Before Filtration, Hours | MgO Content of Filtrate, Weight % |
| --- | --- |
| 0 | 0.37 |
| 1.25 | 0.21 |
| 23 | 0.04 |

EXAMPLE IV

The purified phosphoric acid from Example I was fed to the bottom of a submerged-combustion-type evaporator where it was brought in contact with a downwardly directed stream of air and combustion products having a temperature of about 700° C. On contacting the hot gases, the acid was heated to about 290° C., entrained in the gases, and dehydrated to a viscous superphosphoric acid of about 74% $P_2O_5$ content, of which more than 60 percent was in the polyphosphate form. From the evaporator, the entrained acid, air and gases were passed to an entrainment separator where the acid was separated. The acid was then cooled to below 120° C.

The cooled superphosphoric acid was mixed with water and ammonia at controlled ratios to give an aqueous ammonium phosphate fertilizer solution analyzing 10–11% N and 34–37% $P_2O_5$. The ammonium phosphate solution was chilled to about 30° C. and stored. It remained stable without precipitation of solids for many months. This stability was attributed to the low magnesium content, in as much as similar products containing about twice as much magnesium were stable for only a few weeks.

We claim:

1. A process for separating magnesium from weak wet-process phosphoric acid obtained by treatment of phosphate rock with sulfuric acid and containing dissolved magnesium, silicon, calcium, iron, aluminum, sulfate, fluoride and other impurities, which comprises:
   a. evaporating the phosphoric acid until the silicon content of the acid, measured as $SiO_2$, is reduced to less than 0.2 percent, based on the weight of the concentrated acid;
   b. maintaining the hydrogen fluoride content of the concentrated phosphoric acid at a F/MgO weight ratio of at least 2.2;
   c. maintaining the soluble aluminum content of the concentrated phosphoric acid, measured as $Al_2O_3$, at an $Al_2O_3$/MgO weight ratio of at least 1.4;
   d. maintaining the concentrated phosphoric acid at 50°–100° C. for at least 15 hours to form a precipitate comprising a magnesium-aluminum-fluoride-phosphate complex compound; and
   e. separating the precipitate from the purified concentrated phosphoric acid.

2. A process for separating magnesium from 25–35 percent wet-process phosphoric acid obtained by treatment of phosphate rock with sulfuric acid and containing dissolved magnesium, silicon, calcium, iron, aluminum, sulfate, fluoride and other impurities, which comprises:
   a. evaporating the phosphoric acid at a temperature of 85°–100° C. at a pressure below atmospheric to a concentration of 45–53 weight percent $P_2O_5$, and until the silicon content of the acid, measured as $SiO_2$, is reduced to less than 0.2 percent, based on the weight of the concentrated acid, and the hydrogen fluoride content is increased;
   b. maintaining the hydrogen fluoride content of the concentrated phosphoric acid at a F/MgO weight ratio of at least 2.2;
   c. maintaining the soluble aluminum content of the concentrated phosphoric acid, measured as $Al_2O_3$, at an $Al_2O_3$/MgO weight ratio of at least 1.4;
   d. maintaining the concentrated phosphoric acid at 50°–100° C. for 15–40 hours to form a precipitate comprising a magnesium-aluminum-fluoride-phosphate complex compound; and
   e. separating the precipitate from the purified concentrated phosphoric acid.

3. The process as claimed in claim 2 wherein the F/MgO weight ratio in step (b) is maintained between about 3 and 12 and the $Al_2O_3$/MgO weight ratio in step (c) is maintained between about 3 and 12.

4. The process as claimed in claim 3 wherein the phosphoric acid in step (a) is seeded with 1–4 weight percent solid magnesium-aluminum-fluoride-phosphate complex having a MgO:$Al_2O_3$:F weight ratio of about 1:1.4:2.2.

5. The process as claimed in claim 3 wherein the phosphoric acid in step (d) is seeded with 1–4 weight percent solid magnesium-aluminum-fluoride-phosphate complex having a MgO:$Al_2O_3$:F weight ratio of about 1:1.4:2.2.

6. The process as claimed in claim 3 wherein the phosphoric acid in step (a) is evaporated to a $P_2O_5$ content of 47–51 weight percent $P_2O_5$.

7. The process as claimed in claim 6 wherein the phosphoric acid in step (a) is evaporated until the F/$SiO_2$ weight ratio is between about 10 and 20.

8. The process as claimed in claim 7 wherein the phosphoric acid solution in step (a) is seeded with 1–4 weight percent solid magnesium-aluminum-fluoride-phosphate complex having a MgO:$Al_2O_3$:F weight ratio of about 1:1.4:2.2.

* * * * *

PO-1050
(5/69)

UNITED STATES PATENT OFFICE
CERTIFICATE OF CORRECTION

Patent No. 3,642,439  Dated February 15, 1972

Inventor(s) William P. Moore et al.

It is certified that error appears in the above-identified patent and that said Letters Patent are hereby corrected as shown below:

Column 3, line 57, "50°-100bLC." should read --50°-100°C.--.

Column 3, line 60, "50°-100bLC." should read --50°-100°C.--.

Signed and sealed this 6th day of June 1972.

(SEAL)
Attest:

EDWARD M. FLETCHER, JR.
Attesting Officer

ROBERT GOTTSCHALK
Commissioner of Patents